United States Patent [19]

Dombrowski

[11] 4,174,558

[45] Nov. 20, 1979

[54] FAN OR WHEEL PULLING DEVICE

[76] Inventor: Irvin R. Dombrowski, 613 Linden Ave., Bellwood, Ill. 60104

[21] Appl. No.: 929,546

[22] Filed: Jul. 31, 1978

[51] Int. Cl.[2] .......... B23P 19/04

[52] U.S. Cl. .......... 29/259; 29/264

[58] Field of Search .......... 29/258, 256, 263, 264, 29/265, 266, 259-262

[56] References Cited

U.S. PATENT DOCUMENTS

| | | | |
|---|---|---|---|
| 984,978 | 2/1911 | Straub | 29/258 |
| 1,355,028 | 10/1920 | Blessing et al. | 29/263 |
| 1,654,009 | 12/1927 | Merten | 29/264 |
| 4,077,103 | 3/1978 | Kelley | 29/259 |

*Primary Examiner*—James L. Jones, Jr.

*Attorney, Agent, or Firm*—Darbo & Vandenburgh

[57] ABSTRACT

An improved device facilitates pulling the fan or wheel from a drive shaft, the hub of the fan or wheel being normally secured to the shaft by one or more setscrews, the device circumscribing the hub and being positively secured thereto by bolts received in the setscrew holes in the hub.

6 Claims, 2 Drawing Figures

FAN OR WHEEL PULLING DEVICE

BACKGROUND AND SUMMARY OF THE INVENTION

This invention relates to fan or wheel pulling devices, and more particularly to an improved device which positively engages the hub of a fan or wheel for removal of the fan from a central drive shaft.

It is a commonplace occurrence, during repair or replacement of a fan or pulley wheel in such devices as a compressor, to remove the fan or wheel from the drive shaft. Traditionally, a hub of the fan or wheel is affixed to the shaft by one or more setscrews threadedly secured in holes in the hub and tightly engaging the periphery of the shaft.

To remove the hub from the shaft, the setscrews are first retracted and removed. Then, a conventional apparatus such as that described in U.S. Pat. No. 1,355,028 is placed about the hub. Gripping bolts extending through the housing of the prior art apparatus are then tightened to frictionally engage the periphery of the hub. A compression bolt, passing through the top of the housing and the central aperture of the hub, is rotated in engagement with the shaft, causing the housing and gripped hub to lift from the shaft.

The prior art devices do not grip simple, cylindrical hubs with sufficient force to ensure against slippage in cases where the hub is frozen to the shaft or where the end of the shaft expands due to oxidation over extended period of use. In such cases, it often becomes necessary to sever the hub, and thus destroy the hub in order to facilitate the removal of the hub from the shaft.

This and other disadvantages of the prior art are overcome by the present invention which provides a device for pulling an affixed hub from a drive shaft by positively securing the pulling device to the hub employing the one or more setscrew holes provided in the hub.

The device has a generally cylindrical, hollow housing of a sufficient internal capacity to accommodate the hub. One or more locking bolts extend radially through threaded holes in the wall of the housing and are of a sufficient length to engage the hub. A jacking bolt extends axially through a threaded opening in the top of the housing directly above and engageable with the shaft. At least one circumferential slot is located in the wall of the housing formed in registration with one of the threaded holes in the hub. A threaded engagement screw having threads compatible with the threaded setscrew hole is inserted through the slot and adapted to engage the setscrew hole when the setscrew is removed.

A locking nut is placed on the engagement screw for locking the engagement screw against the outer wall of the device in order to vary the effective length of the engagement screw and thus limit the penetration of the screw into the hub to avoid engagement with the shaft.

In order to aid visual alignment of the housing about the hub, one or more sighting apertures may be provided in the wall of the housing.

In a preferred embodiment of the invention, a pair of the locking bolts extend from diametrically opposite positions in the housing toward each other to engage a hub therebetween. A pair of the slots, spaced at approximately ninety degrees about the circumference of the housing, and a corresponding pair of engagement screws are employed to be screwed into the threaded holes in the hub.

DESCRIPTION OF SPECIFIC EMBODIMENT

Figure 1:
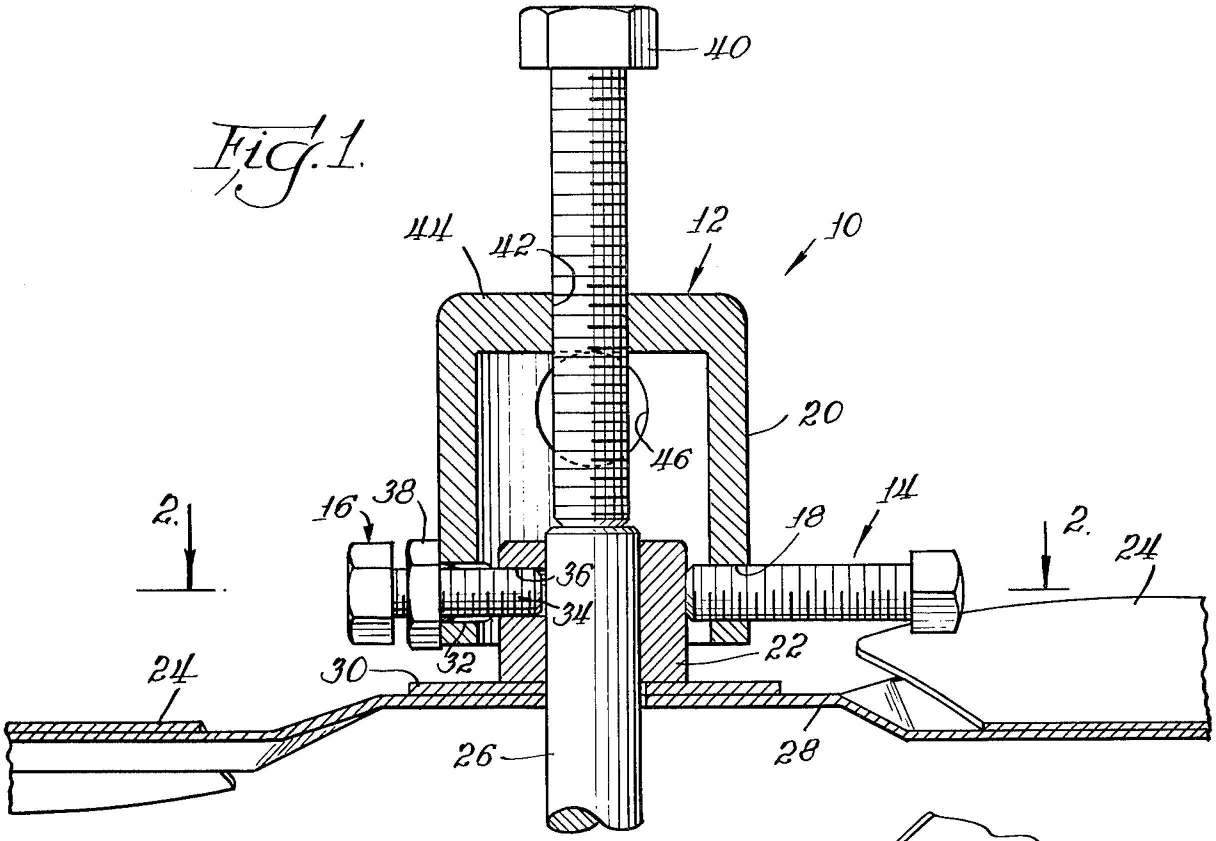
FIG. 1 is a cross-sectional view of the device according to the invention shown in engagement with the hub and shaft of a fan and taken at the line 1—1 of FIG. 2, and FIG. 2. is a cross-sectional illustration taken along line 2—2 of FIG. 1.

The device according to the invention is depicted generally in the drawing at 10. It is composed of a hollow, cylindrical, cap-like housing 12, a pair of locking bolts 14, a pair of engagement screws 16 and a jacking screw 40.

As illustrated in the drawing, the locking bolts 14 extend radially through threaded holes 18 in the cylindrical wall 20 of the housing 12. The bolts 14 are of a sufficient length to pass through the holes 18 and engage a hub 22 of the apparatus which is to be removed. As shown in the drawing, the hub 22 is that of a fan 24 which is mounted on a drive shaft 26.

The hub 22 is securely affixed by welding or the like to cross braces 28 and 30 of the fan 24.

Figure 2:
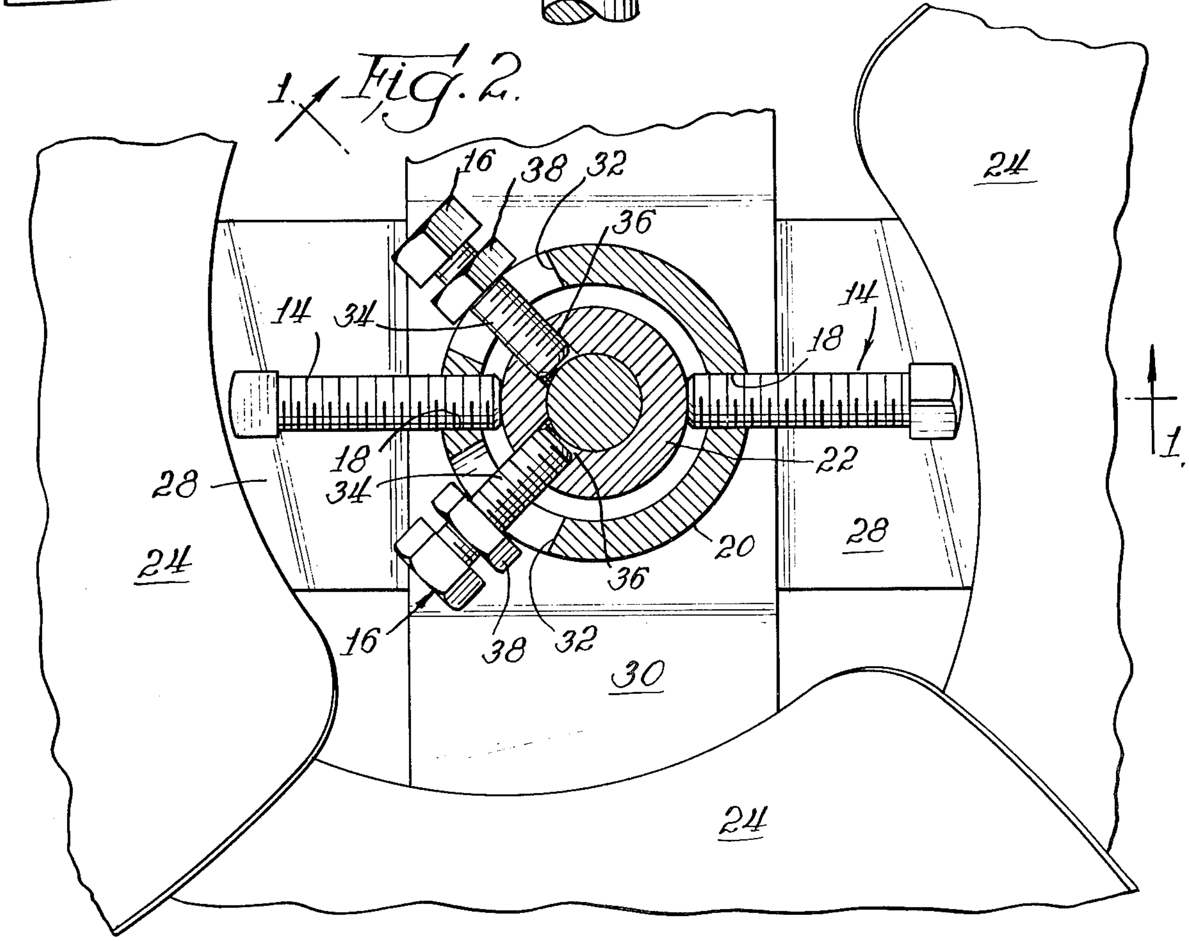

In the embodiment shown, a pair of engagement screws 16 pass through corresponding circumferential slots 32 formed in the wall 20 of the housing 12. As shown in FIG. 1, the width of the slots 32 is only slightly greater than the diameter of the shanks 34 of the engagement screws 16. However, as shown in FIG. 2, the circumferential length of the slots 32 is substantially greater than the diameter of the shanks 34 in order to accommodate varying locations of the engagement screws 16 within the circumferential slots 32 as will be described in greater detail below.

When the fan 24 is in use, a setscrew (not illustrated) is normally inserted in each of the threaded holes 36 in order to affix the hub 22 to the shaft 26. When desiring to pull hub 22 from drive shaft 26, the setscrews located in the threaded holes 36 are first removed. The device 10 is then placed over the hub 22 with the slots 32 located in alignment with the holes 36. The engagement screws 16 are then passed through the slots 32 and partially threaded into the holes 36. Since the hub 22 is to be pulled from the shaft 26, it is important that the inserted engagement screws 16 do not engage the shaft 26 and therefore inhibit removal and possibly cause damage to the shaft during pulling. To assure that the screws 16 do not so interfere, each is provided with a locking nut 38. The locking nut 38 is larger than the width of the slot 32 so that it abuts against the exterior of the wall 20 of the housing 12. By adjusting the nut 38 along the shank 34, each of the engagement screws 16 can be screwed into the threaded holes 36 to close proximity with, but not into engagement with, the shaft 26.

While sighting through the aperture 46, the locking bolts are then tightened against the hub 22 while maintaining axial alignment of the jacking bolt 40 and drive shaft 26. The engagement screws 16 are then screwed fully into the threaded holes 36 until the respective locking nut 38 engage the wall 20 of the housing 12, clearance between the ends of the screws 16 and the periphery of the shaft 26 being assured.

A jacking bolt 40 extends axially through a threaded hole 42 in the top 44 of the housing 12. The bolt 40 is of a sufficient length and is positioned to engage the end of the drive shaft 26 as shown.

The fan 24 is then removed from the shaft 26 by rotation of the jacking bolt 40 against the shaft 26. Since the engagement screws 16 protrude through the housing 12 into the holes 36 in hub 22, as the jacking bolt 40 is rotated, the housing 12 and hub 22 rise as a unit along the shaft 26. The jacking bolt 40 is rotated a sufficient number of revolutions to fully free the hub from the shaft 26.

One embodiment of the invention is illustrated in the drawing and has been described above. Various changes can be made to the invention without departing from the spirit thereof. For example, the invention has been described in conjunction with a pair of the engagement screws 16. A conventional fan for an air conditioning compressor employs a pair of setscrews affixing the hub 22 to the shaft 26. However, in other devices, only one or more than two setscrews may be used to affix the hub to the shaft. Revision of the device 10 would be made accordingly.

Additionally in the apparatus illustrated the setscrews are located approximately ninety circumferential degrees apart in the hub. However, in other apparatus, this angle could be greater or less than that illustrated and described. Therefore, the above description should be considered illustrative of the invention rather than restrictive thereof. The scope of the invention is defined by the following claims.

I claim:

1. A device for pulling from a drive shaft an affixed hub having one or more radial threaded setscrew holes extending therethrough, the device being of the type having a hollow housing of sufficient internal capacity to accommodate the hub, with one or more locking bolts extending radially through threaded holes in the wall of the housing and adapted to engage the hub, and a jacking bolt extending axially through a threaded hole in the top of the housing and positioned to engage the end of the shaft, an improvement comprising:

a. at least one circumferential slot in the wall of the housing located to register with a radial threaded setscrew hole in the hub, and b. a threaded engagement screw having threads compatible with the threaded setscrew hole in the hub, said engagement screw passing through said slot and adapted to be screwed into the threaded setscrew hole to positively secure the housing to the hub for removal of the hub from the shaft during rotation of the jacking bolt against the shaft.

2. The device according to claim 1 including a locking nut on said engagement screw, said locking nut being arranged to abut the outer surface of the housing adjacent said slot to determine the effective length of said engagement screw and thus the depth of insertion thereof into the threaded setscrew hole in the hub.

3. The device according to claim 1 and including an aperture in the wall of the housing for aiding visual alignment of the housing about the hub.

4. The device according to claim 1 and including a pair of said locking bolts extending radially toward each other through corresponding directly opposed threaded holes in the wall of the housing.

5. The device according to claim 1 having two circumferentially aligned and spaced circumferential slots and a corresponding pair of said engagement screws.

6. The device according to claim 5 in which said slots are circumferentially spaced approximately ninety degrees apart.

* * * * *